United States Patent Office.

THOMAS S. CLARK, OF CHARLESTOWN, MASSACHUSETTS.

Letters Patent No. 105,648, dated July 26, 1870.

IMPROVEMENT IN WATER-PROOF CEMENT.

The Schedule referred to in these Letters Patent and making part of the same.

I, THOMAS S. CLARK, of Charlestown, in the county of Middlesex and State of Massachusetts, have invented a new and useful "Water-proof Cement," for builders use, of which the following is a specification.

My invention consists—

In the first place, in the employment, in the manufacture of water-proof cement, of burnt linseed oil, prepared by boiling, and then setting fire to it, by thrusting burning brands into it, until it shrinks in bulk about twenty per cent. This mode of preparation destroys the drying properties of the oil, and causes it to become sticky, so that, while a cement, of which oil thus prepared is component part, will adhere firmly to wood, brick, stone, or iron, it will not dry so as to destroy its elasticity or cause it to crack.

The second part of my invention consists in mixing equal quantities of oil, prepared as above, "common sand," and "yellow ochre," with one-half the quantity of "brown poko."

The sand is a cheap material to give body to the cement; the yellow ochre prevents the sand and oil from running, and the "poko" is used to give a desirable color to the cement.

Whiting may be substituted for the yellow ochre, and any other coloring matter for the brown poko, according to the color desired, without destroying the utility of the cement. Therefore I do not wish to confine myself to the use of the specific ingredients above-named, or to combining them in the exact proportions mentioned, as those proportions may be slightly varied without materially affecting the quality of the cement; but

What I claim as new, and desire to secure by Letters Patent of the United States is as follows:

Claims.

1. The employment of burnt linseed-oil in the manufacture of water-proof cement, substantially as described.

2. A water-proof cement, compounded as herein set forth and described, for the purposes specified.

Executed at Boston this 2d day of June, 1870.

THOMAS S. CLARK.

Witnesses:
    N. O. LOMBARD,
    G. W. PROUTY.